Dec. 21, 1943.   G. J. WISTERMAN ET AL   2,337,289
SHARPENER FOR THE BLADES OF SHEEP SHEARING MACHINES
Filed July 25, 1942
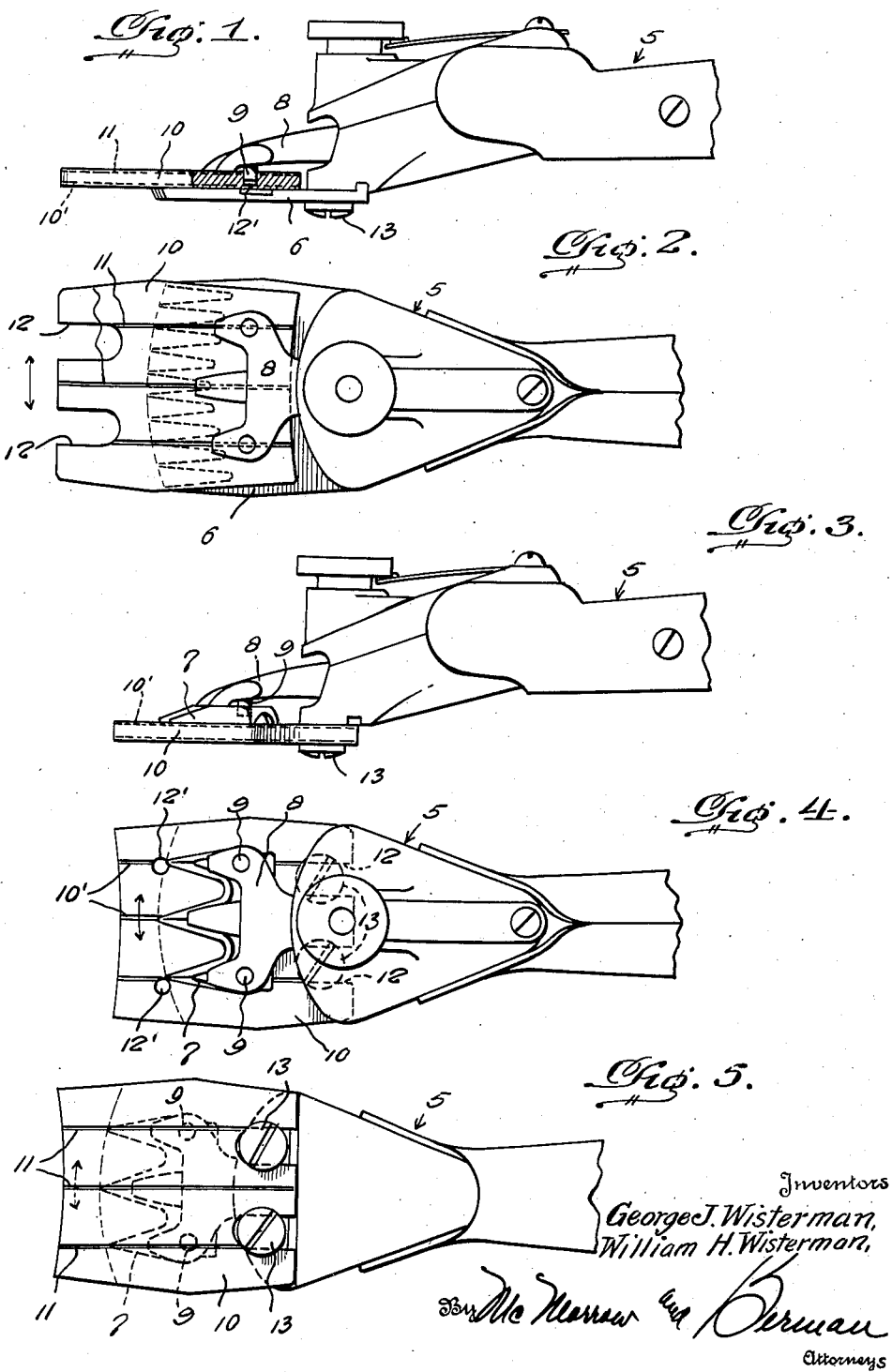

Patented Dec. 21, 1943

2,337,289

UNITED STATES PATENT OFFICE 2,337,289

SHARPENER FOR THE BLADES OF SHEEP SHEARING MACHINES

George J. Wisterman and William H. Wisterman, Alton, Mo.

Application July 25, 1942, Serial No. 452,338

1 Claim. (Cl. 51—241)

This invention relates to a sharpener for cutting blades of sheep shearing machines of either the hand operated or power driven type, and has for the primary object the provision of an inexpensive device of this character in the form of a sharpening element or plate carrying a grinding compound which may be easily and quickly installed in a cutting head of a sheep shearing machine in lieu of either of the cutting blades and by operating the machine as in the act of cutting, said element or plate will quickly and efficiently sharpen the blade remaining in the cutting head so that on both blades being thus sharpened, they will efficiently cut sheep wool regardless of any wear which may be present in the parts of the cutting head.

Another object of this invention is the provision of a device of the above stated character which may be successfully employed by anyone not necessarily skilled in the art of sharpening shearing blades, and which will be durable and economical to manufacture and use.

With these and other objects in view as will become more apparent as the description proceeds, the invention consists in certain novel features of construction, combination and arrangement of parts as will be hereinafter more fully described and claimed.

For a complete understanding of our invention, reference is to be had to the following description and accompanying drawing, in which Figure 1 is a fragmentary side elevation, partly in section, illustrating a cutter head of a sheep shearing machine equipped with a sharpening element in accordance with our invention for sharpening the fixed blade of the cutter head.

Figure 2 is a fragmentary top plan view illustrating the sharpening element or plate positioned in the cutter head for sharpening the fixed blade or teeth thereof.

Figure 3 is a fragmentary side elevation illustrating the present invention attached to the cutter head for sharpening the teeth of the movable blade.

Figure 4 is a fragmentary top plan view illustrating the sharpening element mounted on the head for sharpening the teeth of the movable blade.

Figure 5 is a fragmentary bottom plan view showing the securing of the sharpening element to the head for the purpose of sharpening the teeth of the movable blade.

Referring in detail to the drawing, the numeral 5 indicates in entirety a conventional type of cutting head for a power driven sheep shearing machine including the toothed non-movable cutting blade 6 and the toothed movable blade 7 operated by the arm 8 equipped with pins 9 fitting in sockets of the movable blade in order that the latter may be disconnected from said arm when desired.

It is a well known fact that when the cutting head 5 has been in use for a time, parts thereof will wear and if the blades 6 and 7 are sharpened upon a machine when removed from the cutting head, said blades in many instances will not then efficiently cut after being sharpened owing to the wear of said parts and if sharpened while still mounted on the cutter head will be free of this objection.

The present invention will permit sharpening of either of the blades of the cutting head while remaining on the latter and consists of a sharpening element or plate 10 having grooves 11 in faces thereof and extending endwise of said element or plate and arranged in spaced relation in which grinding compound may accumulate when placed on said faces of the sharpening element or plate.

One end of the element or plate is provided with spaced notches 12 to receive fasteners 13 of the cutter head employed for securing the non-movable cutting blade on the head, whereby the cutting element or plate may be substituted for said blade 6 for the purpose of sharpening the movable blade 7 when moved relative thereto by the movement of the arm 8 of the cutter head.

The sharpening element or plate 10 adjacent the other end and within a face thereof is provided with sockets 12' to receive the pins 9 of the arm 8 when said sharpening element or plate is employed for sharpening the non-movable cutter blade 6.

The sharpening element or plate may be constructed of any material for the purpose and when installed in the cutter head, as shown in Figure 5, with the pins 9 fitting in the sockets 12', said cutter plate will then sharpen the cutting edges of the teeth of the blade 6 when moved relative thereto by the arm 8 of the cutter head. It will be seen that the sharpening element or plate 10 when thus operated in conjunction with the cutter head 5, will have the same motion as the movable blade and its sharpening action upon the cutting edges of the teeth of the non-movable blade 6 will be such that the cutting edges will readily coact with the cutting edges of the movable blade after the sharpening of the latter to efficiently cut sheep wool.

To sharpen the movable blade of the cutter head 5, the non-movable blade 6 is detached from the head 5 by backing the screws slightly outwardly from said head 5 and the sharpening element or plate 10 is then applied to the head and secured in position by the fasteners 13 fitting in the notches 12. With the movable blade applied to the arm 8 as usual and resting against the face of the sharpening element or plate and moved by the arm 8, the sharpening element or plate 10 will efficiently sharpen the edges of the teeth of the movable blade.

A sharpener of the kind described and shown will be extremely simple in construction, durable and economical to manufacture permitting the sale thereof at a low cost, readily within reach of anyone requiring the use of such a device for the sharpening of blades of sheep shearing machines. Also, it will be seen that through the use of the sharpening element or plate 10 either blade of the cutter head may be sharpened by anyone not necessarily skilled in the art of grinding.

While we have shown and described the preferred embodiment of our invention, it will be understood that minor changes in construction, combination and arrangement of parts may be made without departing from the spirit and scope of the invention as claimed.

Having thus described the invention, what we claim is:

In a sharpener for either the movable or non-movable blades of a cutter head of a sheep shearing device, a substantially rectangular shaped sharpening one-piece rigid plate having a length slightly greater than the width thereof and provided with opposite flat faces providing grinding surfaces and having spaced grooves in said faces to receive abrasive material and extending the full length of the plate for the distribution of the abrasive material over said surfaces during the use of the sharpening plate in a cutter head in lieu of either the movable or non-movable blades thereof, said plate having sockets in one face and located adjacent one end thereof to receive pins of a pivotal operating arm of the head and having said last-named end arcuately curved to clear the head during the travel of the plate relative thereto by the operating arm, said plate provided with spaced notches in the other end thereof to receive bolts employed for securing the non-movable blade on the head after the removal of the non-movable blade for sharpening the movable blade.

GEORGE J. WISTERMAN.
WILLIAM H. WISTERMAN.